(12) United States Patent
Wilson

(10) Patent No.: US 10,602,736 B2
(45) Date of Patent: Mar. 31, 2020

(54) PORTABLE WILD HOG TRAP

(71) Applicant: Burlington Welding, LLC, Cherokee, OK (US)

(72) Inventor: Robert Leroy Wilson, Cherokee, OK (US)

(*) Notice: Subject to any disclaimer, the term of this patent is extended or adjusted under 35 U.S.C. 154(b) by 369 days.

(21) Appl. No.: 15/376,535

(22) Filed: Dec. 12, 2016

(65) Prior Publication Data

US 2017/0164600 A1 Jun. 15, 2017

Related U.S. Application Data

(60) Provisional application No. 62/265,934, filed on Dec. 10, 2015.

(51) Int. Cl.
*A01M 23/16* (2006.01)
*A01M 23/18* (2006.01)
*A01M 23/04* (2006.01)
*B60P 3/04* (2006.01)

(52) U.S. Cl.
CPC ............ *A01M 23/16* (2013.01); *A01M 23/04* (2013.01); *A01M 23/18* (2013.01); *B60P 3/04* (2013.01)

(58) Field of Classification Search
CPC ...... A01M 23/04; A01M 23/16; A01M 23/18; A01K 1/0035; A01K 1/0088; B60P 3/04
See application file for complete search history.

(56) References Cited

U.S. PATENT DOCUMENTS 4,366,775 A * 1/1983 Tyquin ..................... B60P 3/04
119/512

FOREIGN PATENT DOCUMENTS

GB 316602 A * 8/1929 ............ A01M 23/20

* cited by examiner

*Primary Examiner* — Jessica B Wong
(74) *Attorney, Agent, or Firm* — Martin S. High, P.C.

(57) ABSTRACT

Embodiments of the Portable Wild Hog Trap are comprised of a wheel winch assembly, a trip plate, two side walls, a front wall, a rear wall, and a floor. The two side walls, the front wall, the rear wall, and the floor are comprised of heavy gauge wire mats and a steel support frame. The rear wall is comprised of a fixed rear wall and a trap gate. The trip plate is comprised of either of heavy gauge wire mats or a steel plate and a steel support frame. The wild hog is lured into the Portable Wild Hog Trap with an appropriate lure positioned such that the wild hog steps on the trip plate actuating a trip spring. The trip spring then slams the trap gate closed trapping the hog or hogs in the Portable Wild Hog Trap.

4 Claims, 12 Drawing Sheets

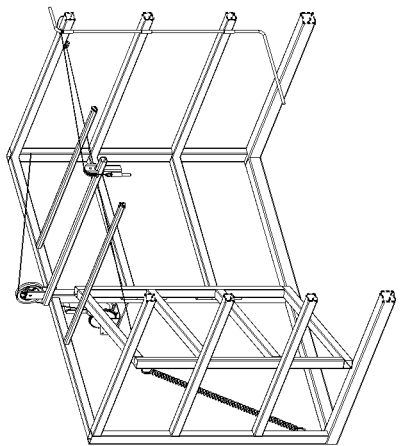
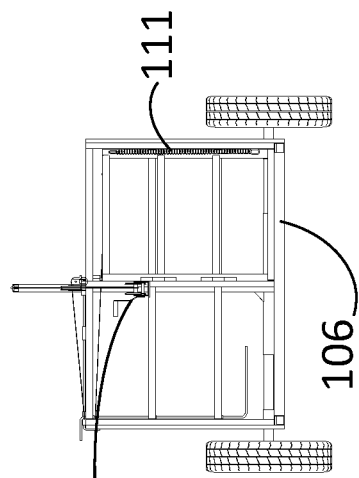
FIG 5B
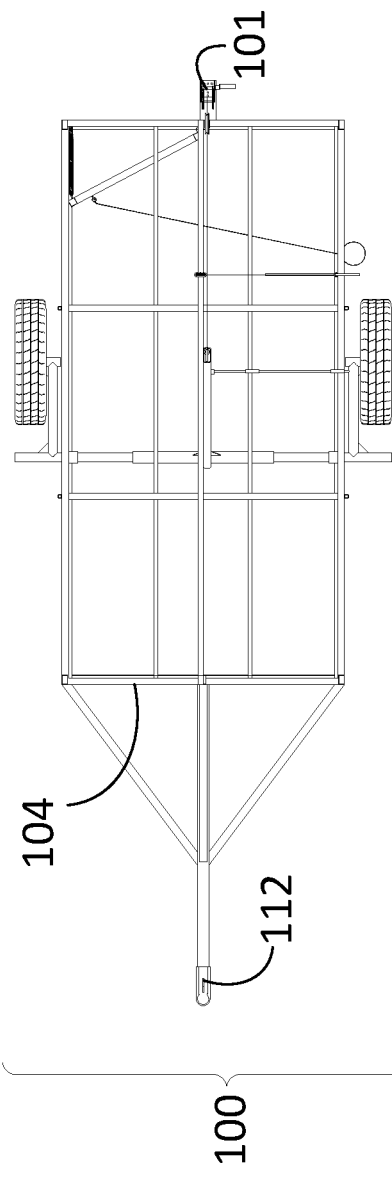
FIG 5A
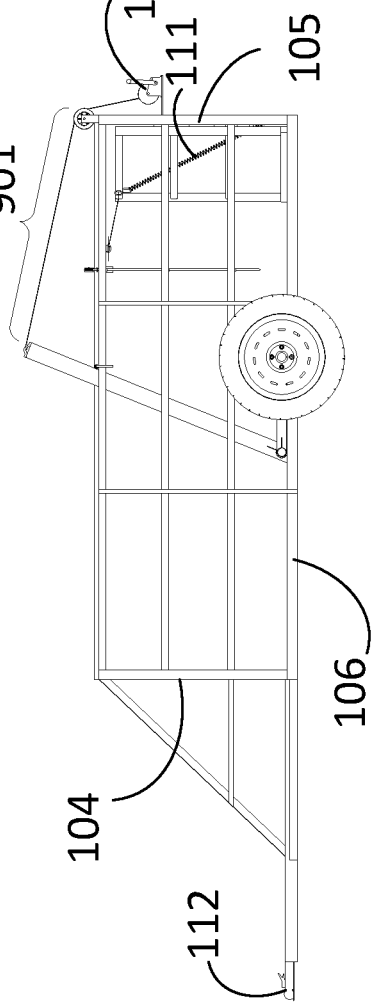
FIG 5C
FIG 5D

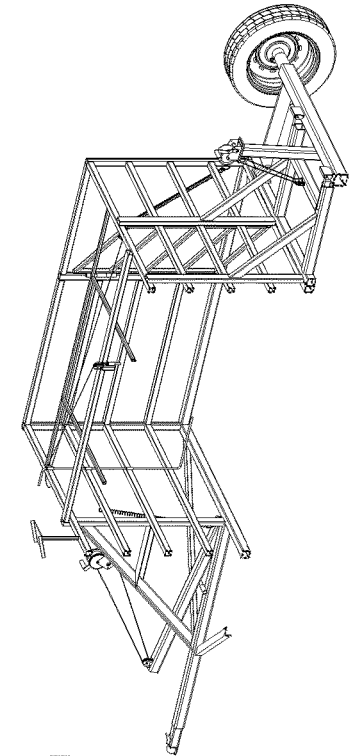
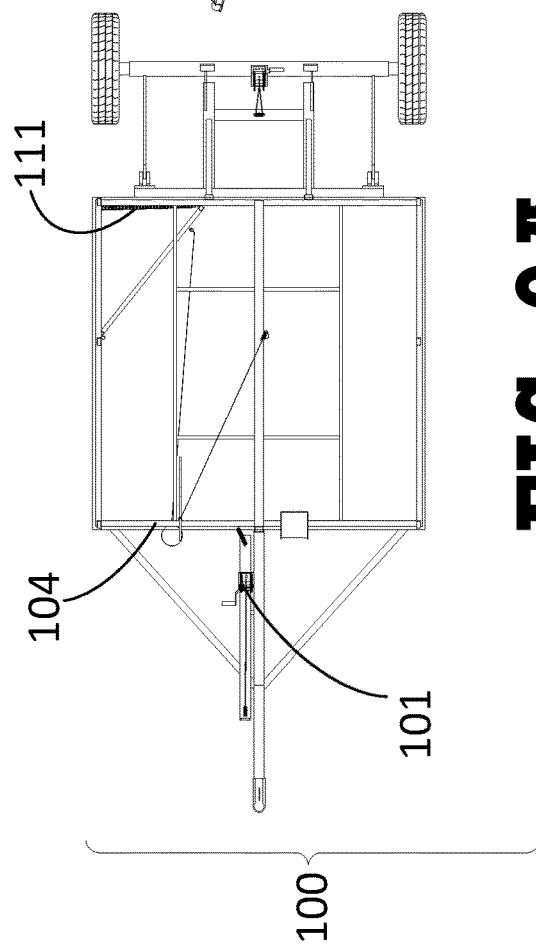
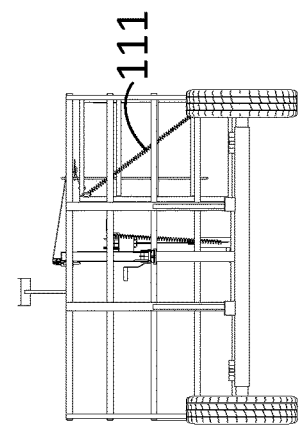
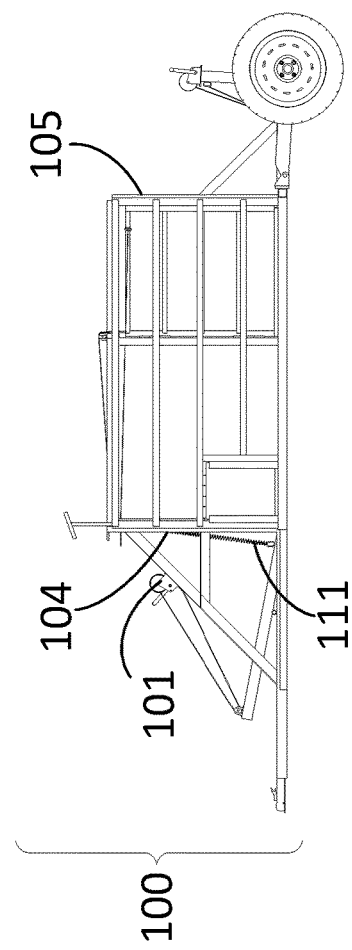
FIG 9B
FIG 9D
FIG 9A
FIG 9C

PORTABLE WILD HOG TRAP

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE EMBODIMENTS

Field of the Embodiments

The field of the embodiments of the Portable Wild Hog Trap is live and kill traps for destructive Wild Hogs. Wild or feral hogs are a particularly vexing problem in Oklahoma and other states throughout California and the southern portion of the country. Wild hogs have been seen as far north as the southern Canada plains. See https://www.wildlifedepartment.com/feral-hogs-in-oklahoma (last visited. Dec. 12, 2016). The destruction to land in the range of feral hogs is significant. In Oklahoma, wild hogs have been detected in 70 of the state's 77 counties, but they are most prevalent across the southern parts of Oklahoma. They are also most active at night. Feral hogs congregate in "sounders," as the large groups are called. Each sounder can tear up several acres every night looking for food, which can include cropland, pastures, golf courses and even residential lawns. They will eat about 4 percent of their body weight daily. Id.

Description of Prior Art

Wild hogs are notoriously destructive to agriculture and difficult to capture due to their high intelligence and instincts. The prior art encompasses a variety of traps aimed at containing wild hogs. Most of these traps fail at their goal due to the high intelligence of the hogs. The goal of the instant invention is to fabricate a portable trap that overcomes the intelligence of the hogs.

SUMMARY OF THE EMBODIMENTS

Embodiments of the Portable Wild Hog Trap are comprised of a wheel winch assembly, a trip plate, two side walls, a front wall, a rear wall, and a floor. The two side walls, the front wall, the rear wall, and the floor are comprised of heavy gauge wire mats and a steel support frame. The rear wall is comprised of a fixed rear wall and a trap gate. The trip plate is comprised of either of heavy gauge wire mats or a steel plate and a steel support frame. The support frames are comprised of 2½ inch by 2½ inch square 4-inch channel. The trip plate is attached to a trip spring and the trip spring is in turn attached to the trap gate. The wild hog is lured into the Portable Wild Hog Trap with an appropriate lure, typically a feed lure. The lure is positioned such that the wild hog steps on the trip plate actuating the trip spring. The trip spring then slams the trap gate closed trapping the hog or hogs in the Portable Wild Hog Trap.

In this respect, it is to be understood that the embodiments in this application are not limited to the details of construction and to the arrangements of the components set forth in the description or illustrated in the drawings. The embodiments are capable of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the embodiments described in this application. Additional benefits and advantages of the present embodiments will become apparent in those skilled in the art to which the embodiments relate from the description of the preferred embodiment and the appended claims, taken in conjunction with the accompanying drawings. It is important, therefore, that the claims be regarded as including such equivalent constructions insofar as they do not depart from the spirit and scope of the embodiments described herein.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the embodiments of the application, which is measured by the claims, nor is it intended to be limiting as to the scope of the embodiments in any way.

BRIEF DESCRIPTION OF THE DRAWINGS

FIG. 5A is a top view of an embodiment of the 6 ft. by 12 ft. Portable Wild Hog Trap without side mesh and bottom mesh with the wheels in the transport configuration; FIG. 5B is a sectional bottom perspective view of an embodiment of the 6 ft. by 12 ft. Portable Wild Hog Trap without side mesh and bottom mesh with the wheels in the transport configuration; FIG. 5C is a side view of an embodiment of the 6 ft. by 12 ft. Portable Wild Hog Trap without side mesh and bottom mesh with the wheels in the transport configuration; FIG. 5D is a rear view of an embodiment of the 6 ft. by 12 ft. Portable Wild Hog Trap without side mesh and bottom mesh with the wheels in the transport configuration.

FIG. 9A is a top view of an embodiment of the 8 ft. by 8 ft. Portable Wild Hog Trap without side mesh and bottom mesh with the wheels in the transport configuration; FIG. 9B is a sectional bottom perspective view of an embodiment of the 8 ft. by 8 ft. Portable Wild Hog Trap without side mesh and bottom mesh with the wheels in the transport configuration; FIG. 9C is a side view of an embodiment of the 8 ft. by 8 ft. Portable Wild Hog Trap without side mesh and bottom mesh with the wheels in the transport configuration; FIG. 9D is a rear view of an embodiment of the 8 ft. by 8 ft. Portable Wild Hog Trap without side mesh and bottom mesh with the wheels in the transport configuration.

DETAILED DESCRIPTION OF THE PREFERRED EMBODIMENTS

Figure 1A:
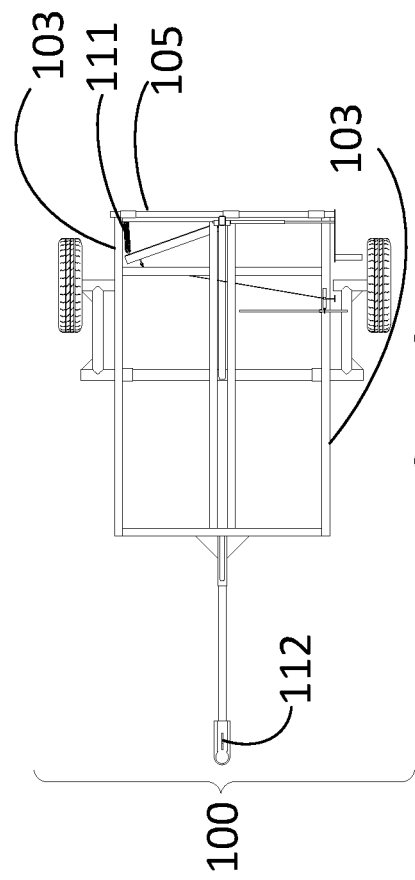
FIG. 1A is a top view of an embodiment of the 4 ft. by 6 ft. Portable Wild Hog Trap without side mesh and bottom mesh with the wheels in the transport configuration.
Figure 1B:
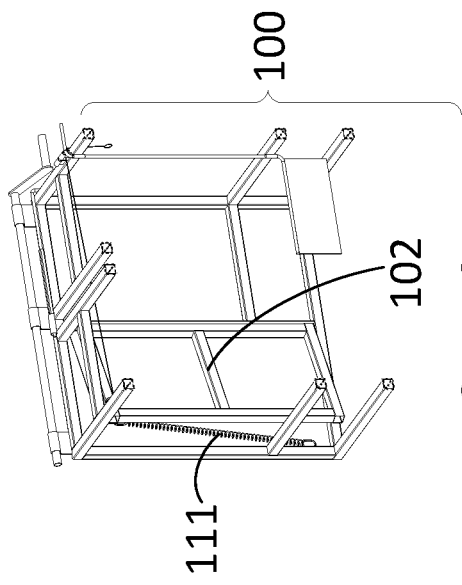
FIG. 1B is a sectional bottom perspective view of an embodiment of the 4 ft. by 6 ft. Portable Wild Hog Trap without side mesh and bottom mesh with the wheels in the transport configuration.
Figure 1C:
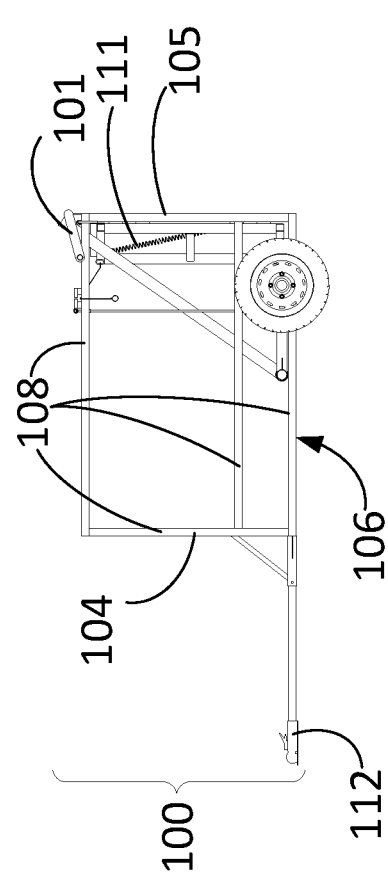
FIG. 1C is a side view of an embodiment of the 4 ft. by 6 ft. Portable Wild Hog Trap without side mesh and bottom mesh with the wheels in the transport configuration.
Figure 1D:
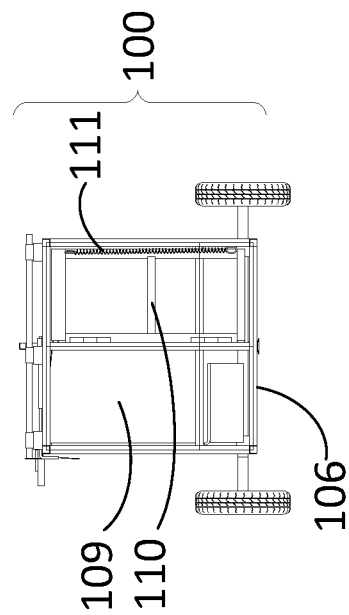
FIG. 1D is a rear view of an embodiment of the 4 ft. by 6 ft. Portable Wild Hog Trap without side mesh and bottom mesh with the wheels in the transport configuration.
Figure 2A:
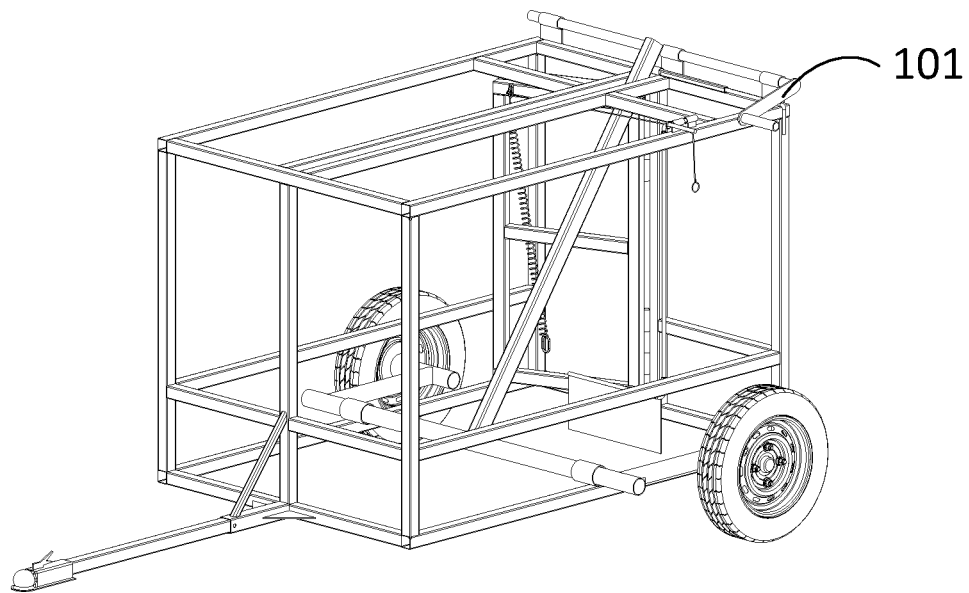
FIG. 2A is a perspective side view of an embodiment of the 4 ft. by 6 ft. Portable Wild Hog Trap without side mesh and bottom mesh with the wheels in the transport configuration.
Figure 2B:
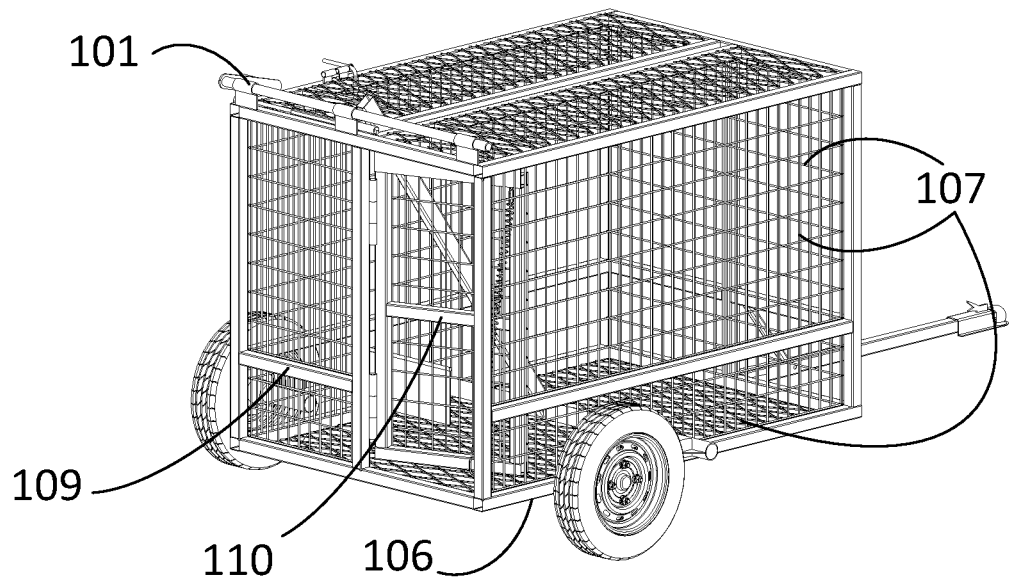
FIG. 2B is a perspective side view of an embodiment of the 4 ft. by 6 ft. Portable Wild Hog Trap with the side mesh and bottom mesh with the wheels in the transport configuration.
Figure 3B:
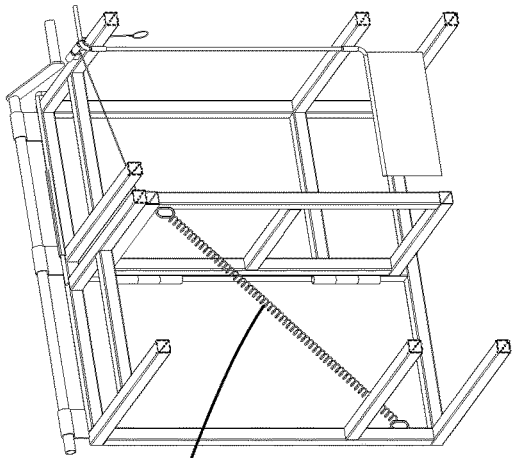
FIG. 3B is a bottom perspective view of an embodiment of the 4 ft. by 6 ft. Portable Wild Hog Trap without side mesh and bottom mesh with the wheels in the raised configuration.
Figure 3D:
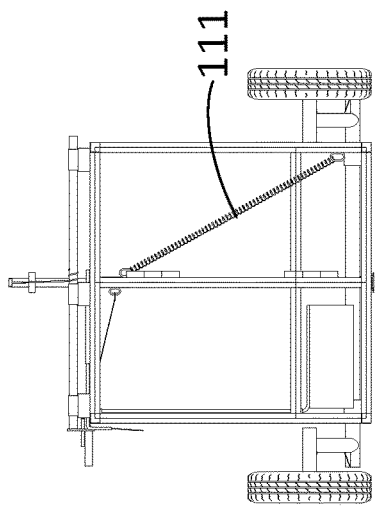
FIG. 3D is a rear view of an embodiment of the 4 ft. by 6 ft. Portable Wild Hog Trap without side mesh and bottom mesh with the wheels in the raised configuration.
Figure 3A:
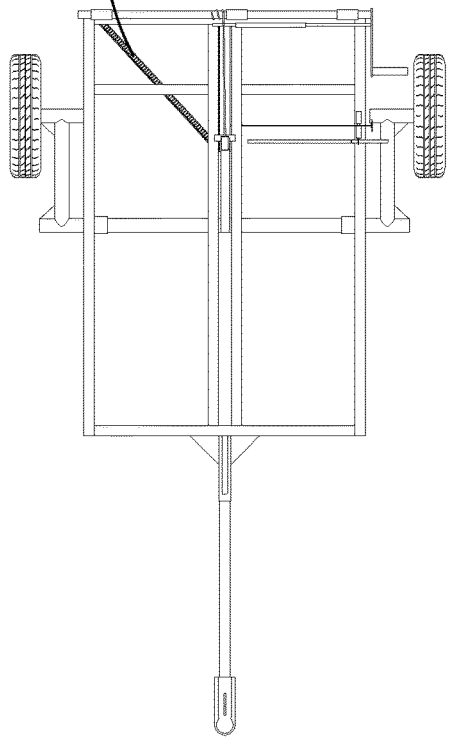
FIG. 3A is a top view of an embodiment of the 4 ft. by 6 ft. Portable Wild Hog Trap without side mesh and bottom mesh with the wheels in the raised configuration.
Figure 3C:
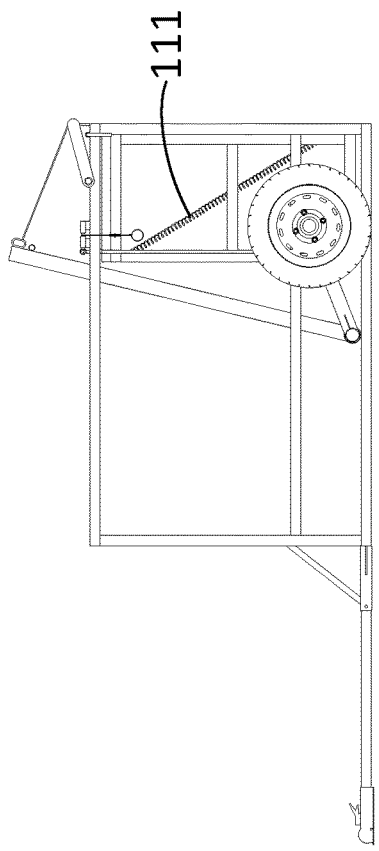
FIG. 3C is a side view of an embodiment of the 4 ft. by 6 ft. Portable Wild Hog Trap without side mesh and bottom mesh with the wheels in the raised configuration.
Figure 4A:
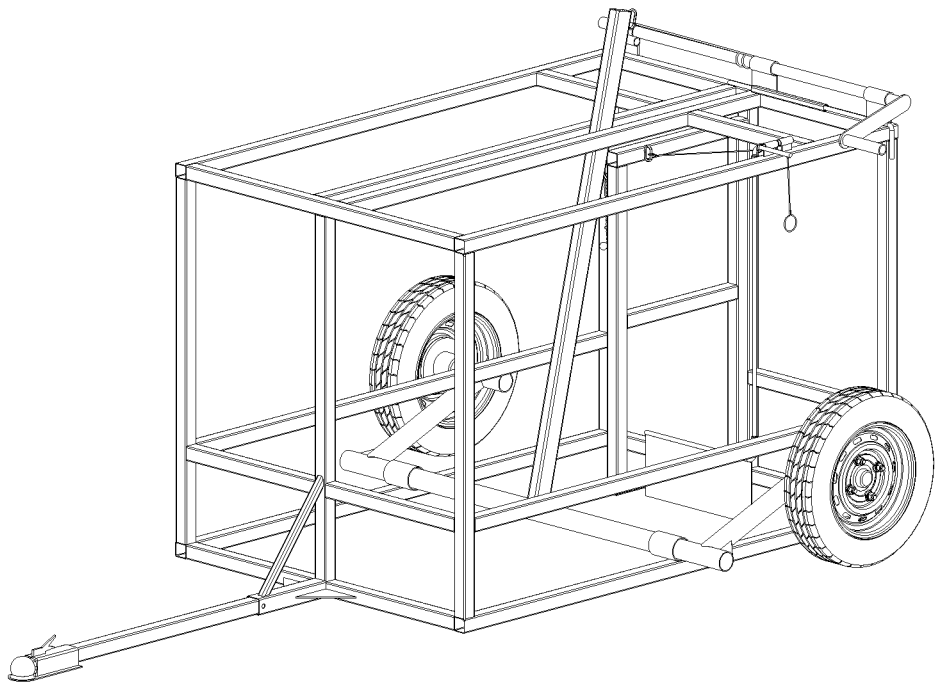
FIG. 4A is a perspective view of an embodiment of the 4 ft. by 6 ft. Portable Wild Hog Trap without side mesh and bottom mesh with the wheels in the raised configuration.
Figure 4B:
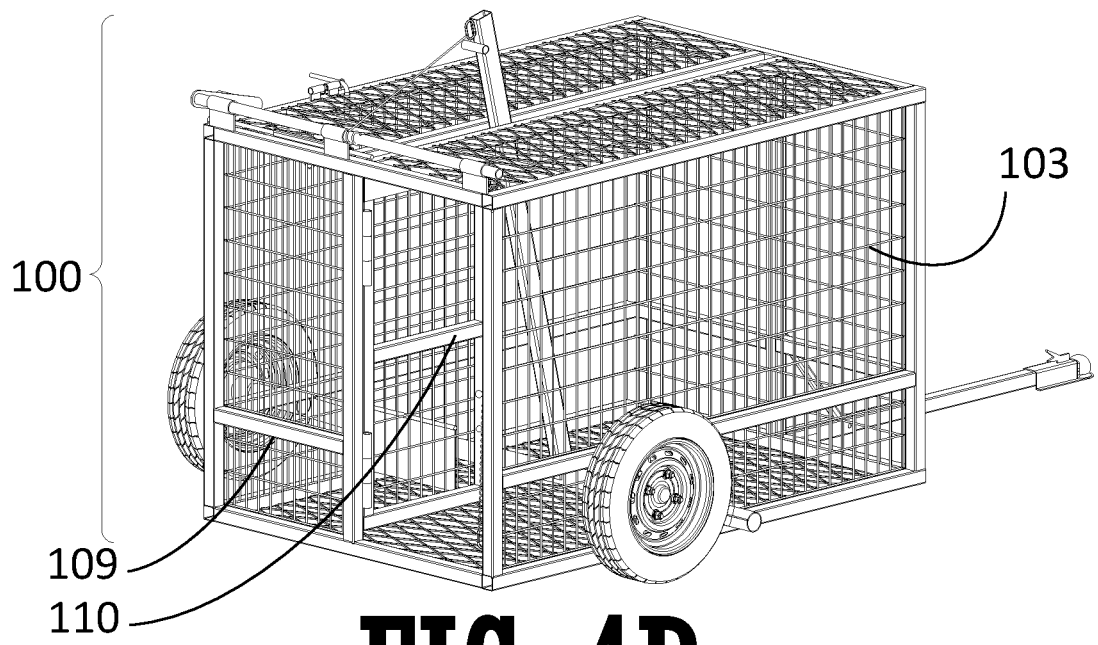
FIG. 4B is a perspective view of an embodiment of the 4 ft. by 6 ft. Portable Wild Hog Trap with the side mesh and bottom mesh with the wheels in the raised configuration.
Figure 6A:
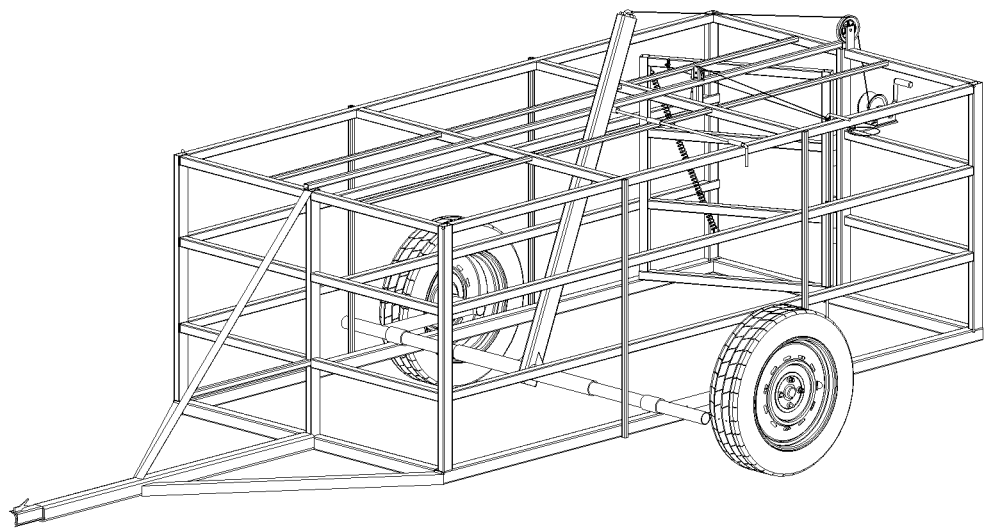
FIG. 6A is a perspective side view of an embodiment of the 6 ft. by 12 ft. Portable Wild Hog Trap without side mesh and bottom mesh with the wheels in the transport configuration.
Figure 6B:
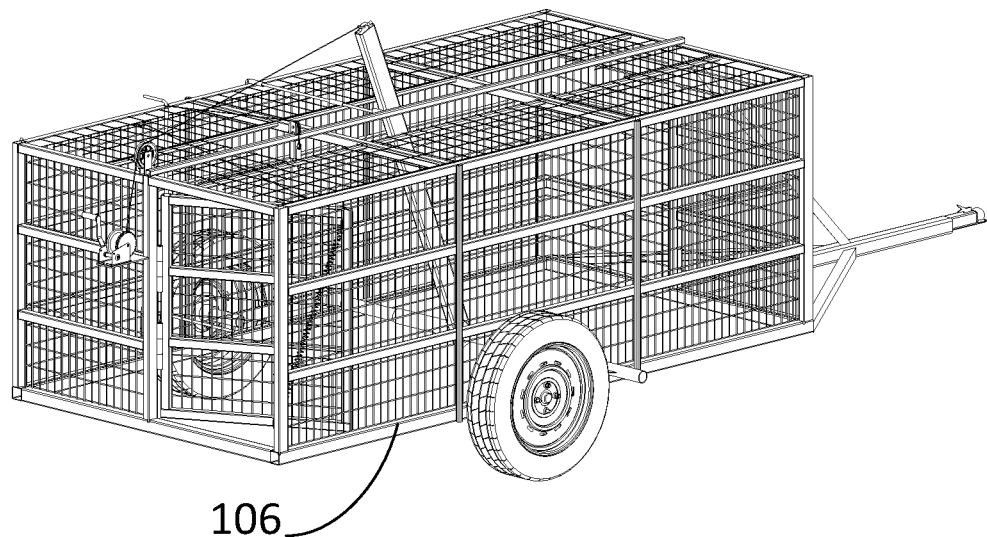
FIG. 6B is a perspective side view of an embodiment of the 6 ft. by 12 ft. Portable Wild Hog Trap with the side mesh and bottom mesh with the wheels in the transport configuration.
Figure 7B:
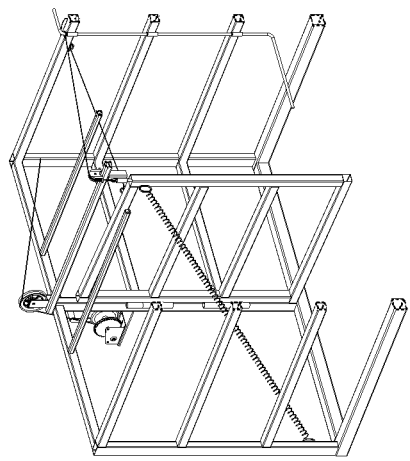
FIG. 7B is a bottom perspective view of an embodiment of the 6 ft. by 12 ft. Portable Wild Hog Trap without side mesh and bottom mesh with the wheels in the raised configuration.
Figure 7D:
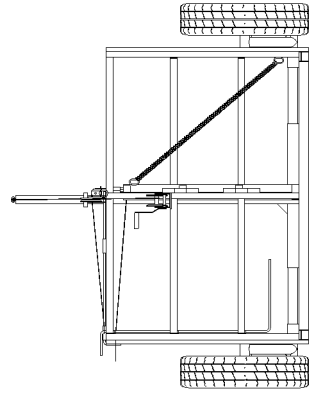
FIG. 7D is a rear view of an embodiment of the 6 ft. by 12 ft. Portable Wild Hog Trap without side mesh and bottom mesh with the wheels in the raised configuration.
Figure 7A:
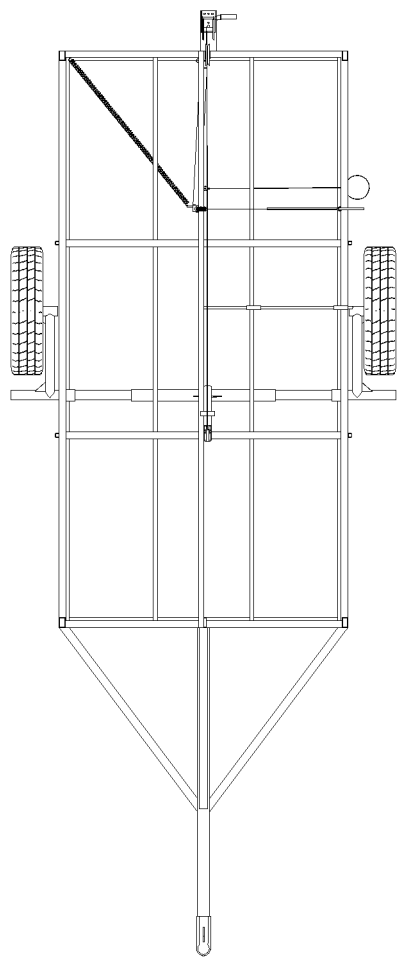
FIG. 7A is a top view of an embodiment of the 6 ft. by 12 ft. Portable Wild Hog Trap without side mesh and bottom mesh with the wheels in the raised configuration.
Figure 7C:
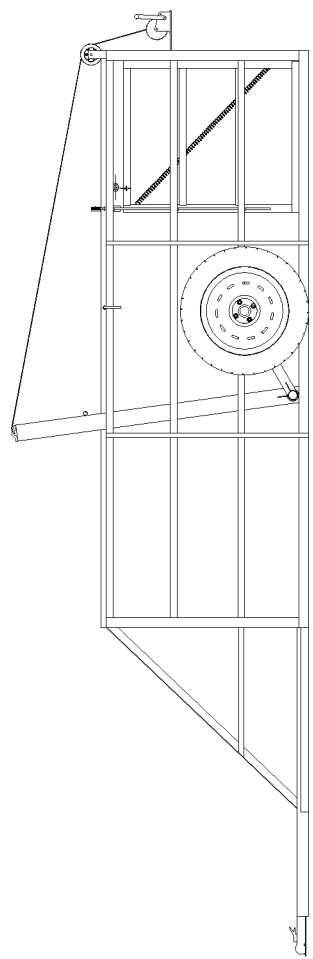
FIG. 7C is a side view of an embodiment of the 6 ft. by 12 ft. Portable Wild Hog Trap without side mesh and bottom mesh with the wheels in the raised configuration.
Figure 8A:
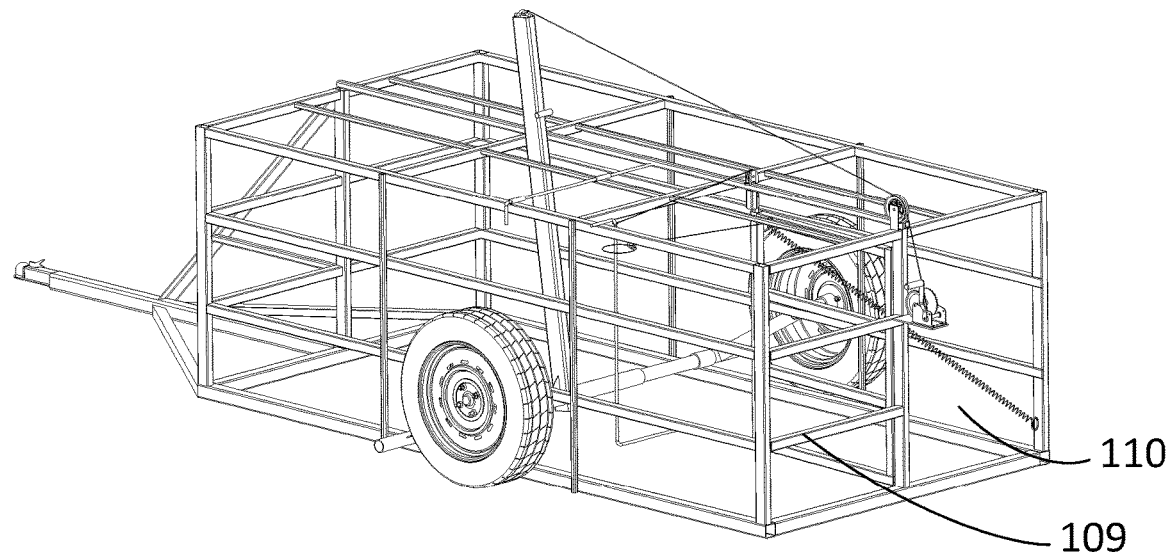
FIG. 8A is a perspective view of an embodiment of the 6 ft. by 12 ft. Portable Wild Hog Trap without side mesh and bottom mesh with the wheels in the raised configuration.
Figure 8B:
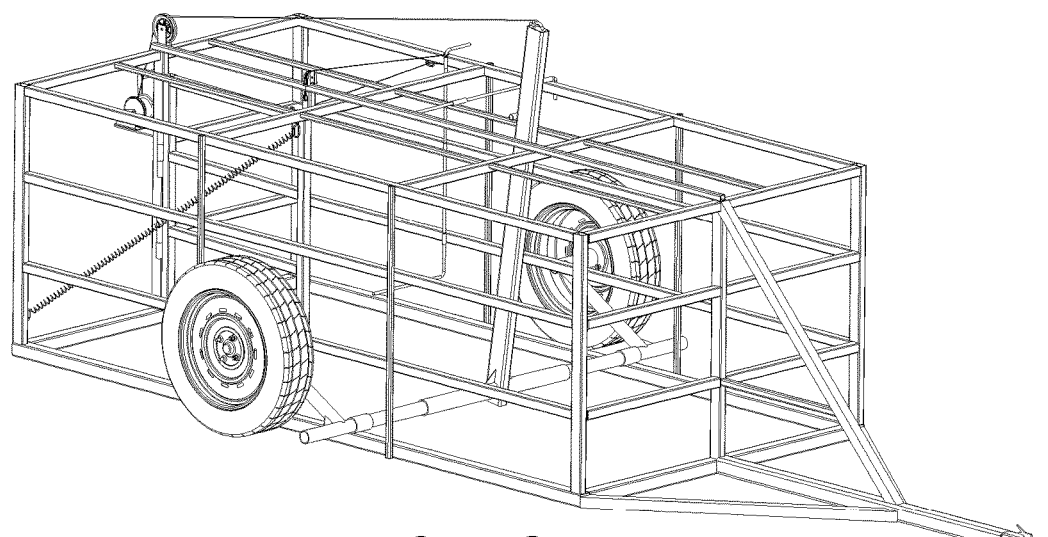
FIG. 8B is a perspective view of an embodiment of the 6 ft. by 12 ft. Portable Wild Hog Trap without the side mesh and bottom mesh with the wheels in the raised configuration.
Figure 10A:
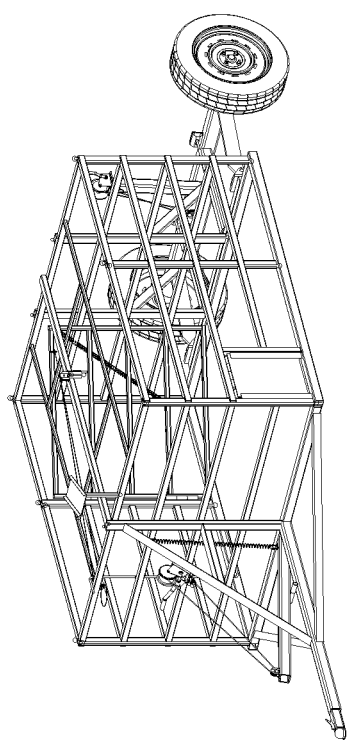
FIG. 10A is a perspective side view of an embodiment of the 8 ft. by 8 ft. Portable Wild Hog Trap without side mesh and bottom mesh with the wheels in the transport configuration.
Figure 10B:
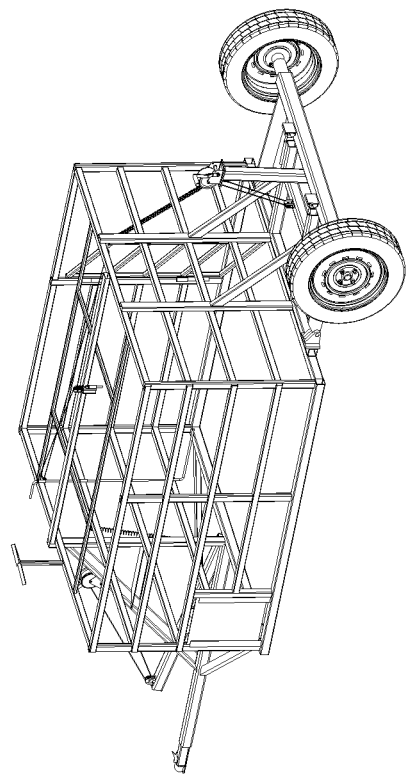
FIG. 10B is a perspective side view of an embodiment of the 8 ft. by 8 ft. Portable Wild Hog Trap without the side mesh and bottom mesh with the wheels in the transport configuration.
Figure 10C:
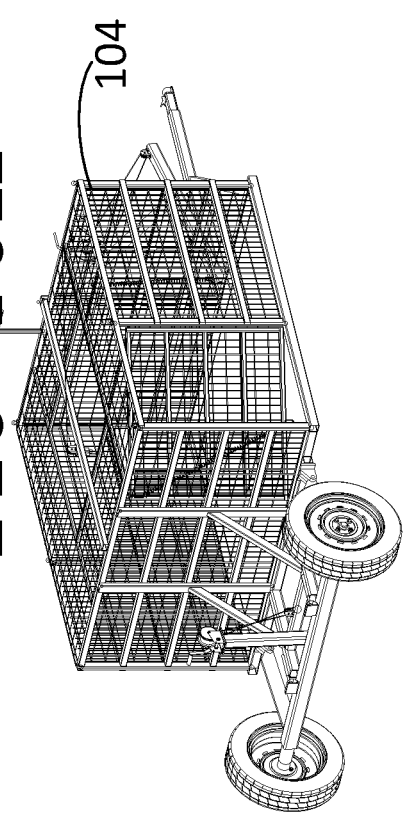
FIG. 10C is a perspective side view of an embodiment of the 8 ft. by 8 ft. Portable Wild Hog Trap with the side mesh and bottom mesh with the wheels in the transport configuration.
Figure 10D:
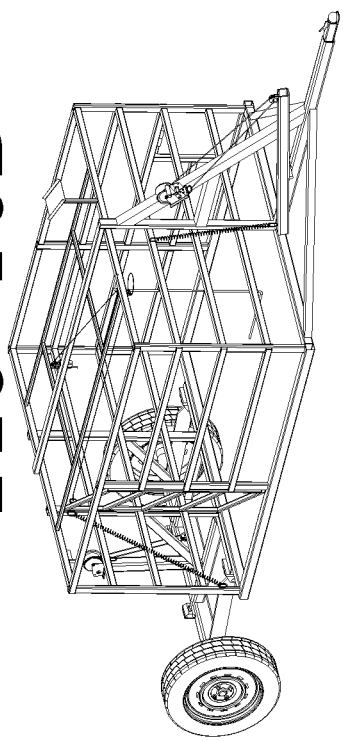
FIG. 10D is a perspective side view of an embodiment of the 8 ft. by 8 ft. Portable Wild Hog Trap without the side mesh and bottom mesh with the wheels in the transport configuration.
Figure 11A:
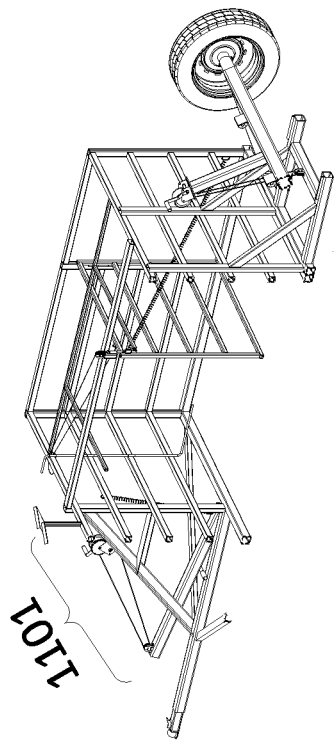
FIG. 11A is a top view of an embodiment of the 8 ft. by 8 ft. Portable Wild Hog Trap without side mesh and bottom mesh with the wheels in the raised configuration.
Figure 11B:
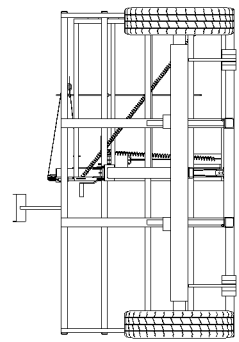
FIG. 11B is a bottom perspective view of an embodiment of the 8 ft. by 8 ft. Portable Wild Hog Trap without side mesh and bottom mesh with the wheels in the raised configuration.
Figure 11C:
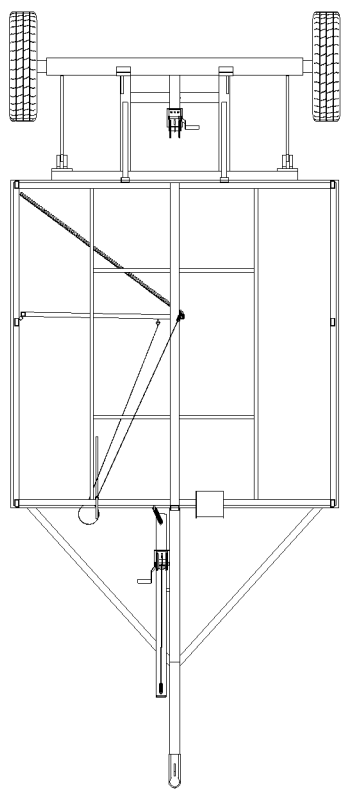
FIG. 11C is a side view of an embodiment of the 8 ft. by 8 ft. Portable Wild Hog Trap without side mesh and bottom mesh with the wheels in the raised configuration.
Figure 11D:
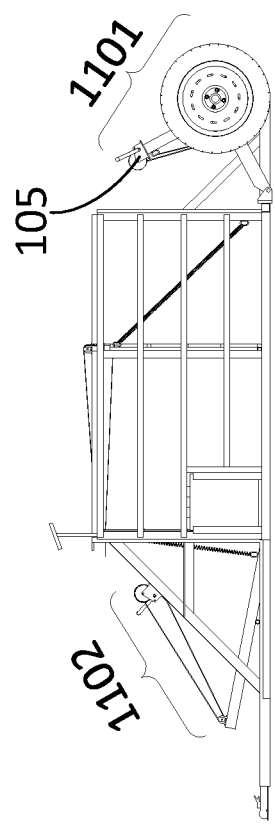
FIG. 11D is a rear view of an embodiment of the 8 ft. by 8 ft. Portable Wild Hog Trap without side mesh and bottom mesh with the wheels in the raised configuration.
Figure 12A:
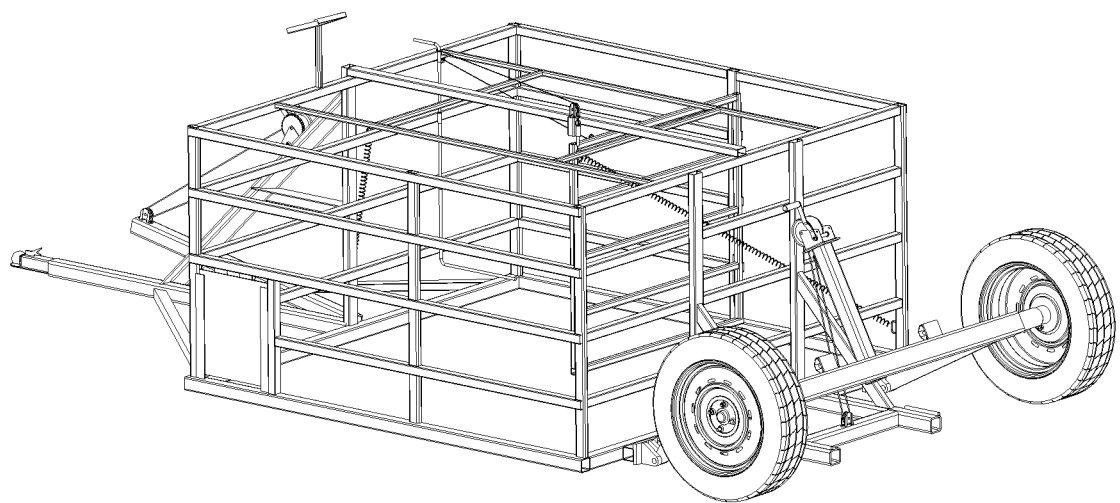
FIG. 12A is a perspective view of an embodiment of the 8 ft. by 8 ft. Portable Wild Hog Trap without side mesh and bottom mesh with the wheels in the raised configuration.
Figure 12B:
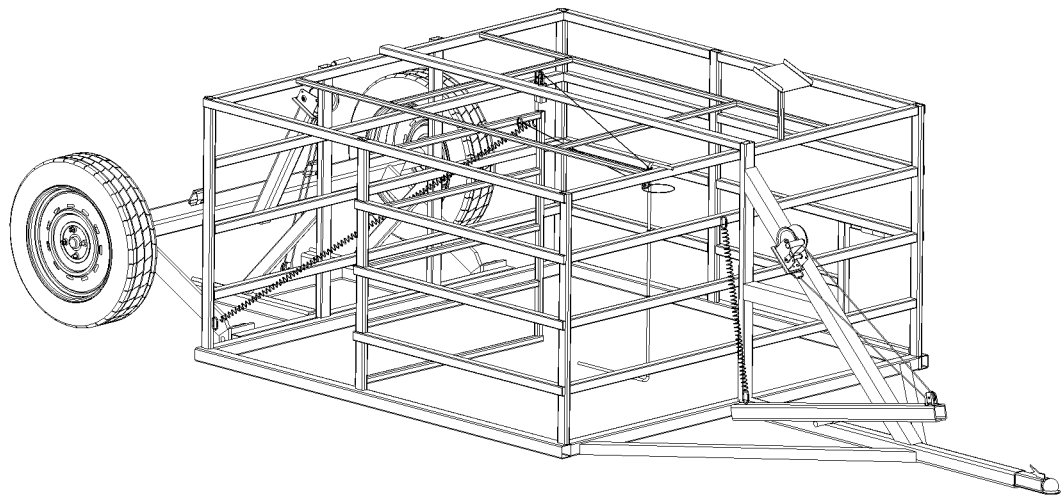
FIG. 12B is a perspective view of an embodiment of the 8 ft. by 8 ft. Portable Wild Hog Trap without the side mesh and bottom mesh with the wheels in the raised configuration.

Embodiments of the Portable Wild Hog Trap 100 are comprised of a wheel winch assembly 101, a trip plate 102, two side walls 103, a front wall 104, a rear wall 105, and a floor 106. The two side walls 103, the front wall 104, the rear wall 105, and the floor 106 are comprised of heavy gauge wire mats 107 and a steel support frame 108. The rear wall is comprised of a fixed rear wall 109 and a trap gate 110. The trip plate 102 is comprised of either of heavy gauge wire mats or a steel plate and a steel support frame. The support frames are comprised of 2½ inch by 2½ inch square 4-inch channel. The trip plate is attached to a trip spring 111 and the trip spring 111 is in turn attached to the trap gate 110. The wild hog is lured into the Portable Wild Hog Trap 100 with an appropriate lure, typically a feed lure. The lure is positioned such that the wild hog steps on the trip plate it actuates the trip spring. The trip spring then swiftly closes the trap gate trapping the hog or hogs in the Portable Wild Hog Trap 100.

Embodiments of the Portable Wild Hog Trap 100 are comprised of overall dimensions of 4 ft. wide by 6 ft. long, 6 ft. wide by 12 ft. long, 8 ft. wide by 8 ft. long, and 8 ft. wide by 20 ft. long. These embodiments will have side walls, back walls, and front walls of corresponding length.

The wheel winch assembly allows the Portable Wild Hog Trap 100 to be mobile. The winch assembly is comprised of either an internal winch assembly 901 or an external winch assembly 1101. The internal winch assembly 901 allows the wheels of the Portable Wild Hog Trap 100 to be actuated from within the length of the side walls 103 and between the rear wall 105 and front wall 104. The internal actuation reduces the overall length of the Portable Wild Hog Trap 100. In contrast, the external winch assembly 901 is used for larger and heavier versions of the Portable Wild Hog Trap 100 permitting transport of the greater weight of those versions by placing the wheel assembly to the rear of the side walls 103 and the rear wall 105.

The two side walls 103, the front wall 104, and the rear wall 105 are nominally 6 feet in height. The length of two side walls 103, the front wall 104, and the rear wall 105 vary depending on the overall dimensions of the Portable Wild Hog Trap 100.

The internal winch assembly 901 is comprised of a jack 105 capable of lifting at least 5000 pounds. The jack 105 is used for lifting the Portable Wild Hog Pen 100 to the transportation position and positioning the wheels 113 in the transportation position. When the Portable Wild Hog Trap 100 is to be deployed the jack 105 is used to raise the wheels and place the Portable Wild Hog Trap 100 on the ground.

The external winch assembly 1102 is comprised of a jack 105 capable of lifting at least 5000 pounds. The jack 105 is used for lifting the Portable Wild Hog Pen 100 to the transportation position and positioning the wheels 113 in the transportation position. When the Portable Wild Hog Trap 100 is to be deployed the jack 105 is used to raise the wheels and place the Portable Wild Hog Trap 100 on the ground.

Larger embodiments (8 ft by 8 ft and larger) of the Portable Wild Hog Trap 100 comprise a hitch winch 1102. The hitch winch 1102 allows for the ball hitch 112 to be raised off the ground for engagement with a ball hitch of the vehicle.

Embodiments of the Portable Wild Hog Trap 100 comprise a 2-inch ball hitch 112, stop and turn lights on the rear portion of the Portable Wild Hog Trap, a straight 5200 lb. axle; two 15 inch tires and wheels 113; a trap gate that opens 4' tall and 20' long; five (5) lock hooks on each trap gate; a frame comprised of 2½ inch by 2½ inch square 4-inch channel, and heavy wire mats. The Portable Wild Hog Trap is 8 feet tall in the transportation configuration.

Portable Wild Hog Trap 100 can be moved with a truck using the ball hitch 112. The ball hitch is attached to a standard ball hitch on a vehicle and then transported to a needed location. This provides needed flexibility for trapping wild hogs as the intelligence of wild hogs tends to force them into different locations.

What is claimed is:

1. A portable wild hog trap comprised of a wheel winch assembly, a trip plate, two side walls, a front wall, a rear wall, and a floor.

2. The portable wild hog trap in claim 1 wherein the two side walls, the front wall, the rear wall, and the floor are comprised of heavy gauge wire mats and a steel support frame; and wherein the rear wall is comprised of a fixed rear wall and a trap gate; and wherein the trip plate is comprised of a steel support frame and either heavy gauge wire mats or a steel plate.

3. The portable wild hog trap in claim 2 wherein the support frames are comprised of 2½ inch by 2½ inch square channel.

4. The portable wild hog trap in claim 3 wherein the trip plate is attached to a trip spring and the trip spring is in turn attached to the trap gate.

\* \* \* \* \*